United States Patent
Whelan et al.

[11] Patent Number: 5,364,005
[45] Date of Patent: Nov. 15, 1994

[54] ULTRASONIC TRANSDUCER AND MOUNT

[75] Inventors: Paul Whelan, Addison; Mike Whelan, Coppell, both of Tex.

[73] Assignee: Verity Instruments Inc., Dallas, Tex.

[21] Appl. No.: 148,285

[22] Filed: Nov. 8, 1993

[51] Int. Cl.⁵ .................................. H01L 21/60
[52] U.S. Cl. .............................. 228/1.1; 310/323
[58] Field of Search .............. 228/1.1; 310/323, 325

[56] References Cited
U.S. PATENT DOCUMENTS

| | | | |
|---|---|---|---|
| Re. 25,033 | 8/1961 | Balamuth et al. | 228/1.1 X |
| 3,054,309 | 9/1962 | Elmore et al. | 228/1.1 |
| 3,752,380 | 8/1973 | Shoh | 228/1.1 |
| 4,598,853 | 7/1986 | Hill | 228/1.1 X |
| 4,884,334 | 12/1989 | Houser et al. | 228/1.1 X |

*Primary Examiner*—Kenneth J. Ramsey
*Attorney, Agent, or Firm*—Arthur F. Zobal

[57] ABSTRACT

The transducer has a metal body with a welding end, an opposite end for supporting a source for causing the body and the welding end to vibrate at ultrasonic frequency for welding purposes and an intermediate mounting structure for supporting the body for welding purpose. The mounting structure may be a cylinder or flange spaced from and surrounding the body with at least two spaced apart spokes connected between the body and the mounting structure.

9 Claims, 1 Drawing Sheet

ULTRASONIC TRANSDUCER AND MOUNT

BACKGROUND OF THE INVENTION

1. Field of the Invention

The invention relates to an ultrasonic transducer for use for welding purposes and a mount for supporting the transducer.

2. Description of the Prior Art

Ultrasonic transducers for welding purposes have been employed for many years as exemplified by U.S. Pat. No. 3,054,309 which patent is incorporated herein by reference. The transducer mounts of these transducers are generally a solid metal body in the shape of a cylinder, barrel or flat wall also called a flange connected 360° to and around the transducer. The mount provides support for the vibrating body and piezo ceramic stack or motor employed for vibrating the transducer.

Because of the fact that the mount is a solid body, the amount of ultrasonic energy lost through the holding assembly can very forcing the ultrasonic transducer to operate at a reduced efficiency mode. Significant levels of vibratory energy may be lost because the solid transducer mount provides an easy path to the holding assembly of the interconnection equipment. At the same time the electrical circuit formed by the elements in the transducer are then more susceptible to variations in impedance and the associated loss of energy that was intended for the bonding surface.

SUMMARY OF THE INVENTION

It is an object of the invention to provide an ultrasonic transducer mount which reduces the loss of energy and which increases the welding efficiency of the transducer.

The mount comprises structure spaced from and surrounding the body of the transducer with at least two spaced apart spokes connected between the body and the mount.

In the embodiments disclosed the mount may be a cylinder or a flange.

DESCRIPTION OF THE PREFERRED EMBODIMENT

Figure 1:
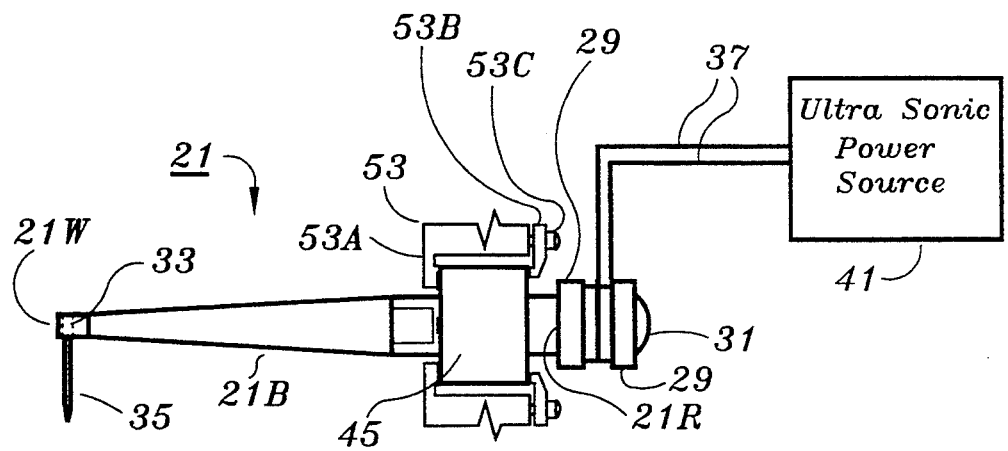
FIG. 1 is a side view of one embodiment of the transducer mount coupled to a transducer.
Figure 2:
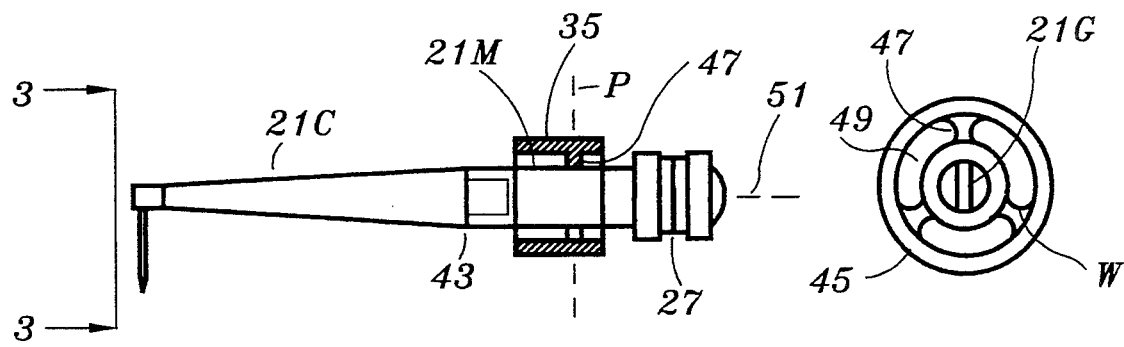
FIG. 2 illustrates a cross section of the mount of FIG. 1 connected to the transducer.
Figure 3:
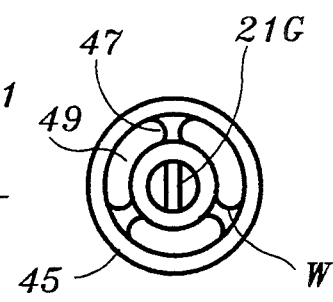
FIG. 3 is an enlarged view of the transducer of FIG. 2 as seen from lines 3—3 thereof with the welding tip removed.

Referring now to FIGS. 1-3 of the drawings, the ultrasonic transducer 21 comprises a stainless steel body 21B having a welding end 21W and an opposite end 21R for supporting a source which in the embodiment disclosed is a piezoelectric ceramic crystal device 27 for causing the body to vibrate at desired frequency for welding purposes. The crystals 27 are annular members held between two washers 29 which are connected to the rear end 21R of the body 21B by a bolt 31 screwed into a threaded aperture (not shown) extending into the end 21R of member 21B. The welding end 21W has a gap 21G leading to an aperture 33 formed therethrough for receiving a welding tip 35 and which is secured therein by a set screw (not shown). Electrical leads 37 are connected to the crystals and to a high frequency electrical source 41 for actuating the crystals 27 for producing a voltage output at a frequency of 20-120 KHz or higher at a voltage level of 0.5-25 volts.

The transducer body 21B is solid and has a cone shape portion 21C from end 21W to position 43 with a stainless steel cylindrical mount 45 secured to the body portion 21M between position 43 and the crystals 27. As shown in FIG. 3, the cylindrical mount 45 is spaced from the body 21B substantially 360° around the cylindrical body portion 21M by three stainless steel spokes 47 located in the same plane and which extend from the body portion 21M to the inside of the cylindrical mount 45. The centers of adjacent spokes are spaced 120° apart. Arcuate gaps 49 extend between adjacent spokes 47, body portion 21M, and the inside of the cylinder 45. The spokes 47 provide an electro-mechanical restrictive path that isolate the transducer vibrating body from the mounting or holding assembly. The electro-mechanical isolation technique achieves two objectives; first, it provides a mechanical resistance that isolates the ultrasonic energy generated by the piezo ceramic crystals or motor stack and thus improves operating efficiency, and second, it beneficially stabilizes electrical parameters, presenting a transducer load which is easier to control at the generating source.

To further improve transducer performance the thin contacts or spokes are aligned to the acoustical vibrating node of the operating frequency forcing the vibratory (ultrasonic) energy to be transferred directly from the motor stack (piezo stack) to the welding tip. This is done by locating the spokes 47 at the node or point of minimal wave motion along the length of the transducer body.

In one embodiment, the transducer of FIGS. 1-3 has a length of about 3.75 inches between ends 21W and 21R and an outside diameter of about 5/16 of an inch at body portion 21M. The cylindrical mount 45 has a length of about 9/16 of an inch and a wall thickness of about 1/16 of an inch. The spokes 47 each has a width W of about 0.065 of an inch, a thickness along the length of the body of a about 0.100 of an inch and a radial dimension between the body portion 21M and the inside of the cylinder 45 of 0.600 of an inch. The distance between end 21W and the spokes 47 is about 2 14/16 inches. In FIG. 2 the axis of the body is shown at 51. In FIG. 1 two removable clamps 53 are shown connected to the mount 45 for supporting the mount 45 and transducer 21 to structure of the welding system. Each clamp 53 comprises a hook shaped member 53A coupled to one end of the cylinder 45 and to a L shaped member 53B which is coupled to the other end of the cylinder 45 and to member 53B by a bolt 53C. It is to be understood that the transducer 21 and its mount 45 could have other dimensions than described above. The body 21, mount 45 and spokes 51 are machined from a single piece of stainless steel.

Figure 4:
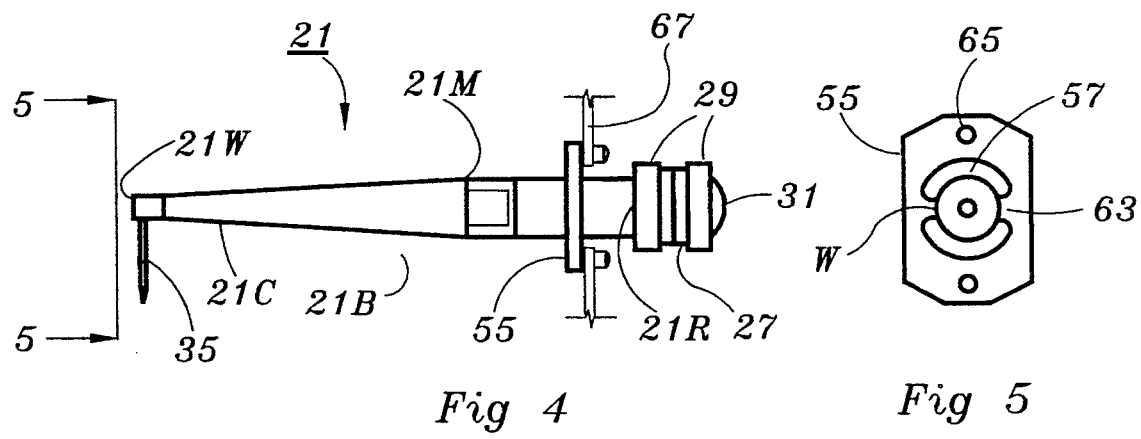
FIG. 4 is another embodiment of a transducer mount coupled to the transducer.
Figure 5:
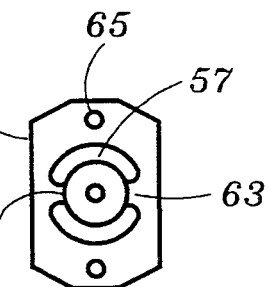
FIG. 5 is an enlarged view of FIG. 4 as seen from lines 5—5 thereof with the welding tip removed.

The transducer 21 of FIGS. 4 and 5 is similar to that of FIGS. 1-3 except that its body 21B is smaller in length and diameter with a longer proportionate cone shaped portion 21C and the mount 55 is a planar type plate or flange which is spaced from and extends around the cylindrical portion 21M of the transducer body 21B.

Two spokes 63 extend from the body portion 21M to the flange 55. Arcuate gaps 57 extend between spokes 63, body portion 21M and the flange 55. The mount 55 has two holes 65 formed therethrough for securing the flange 55 to a support. The transducer body, flange 55 and spokes are machined from a single piece of stainless steel. The transducer body 21B of FIGS. 4 and 5 has a length between ends 21W and 21R of about 2¾ inches and an outside diameter of about 4/16 of an inch at body portion 21M. The distance between end 21W and flange 55 is about 2 6/16 inches. The flange 55 has a thickness of about 0.100 of an inch. The width W of each of the spokes 63 is about 0.065 of an inch and the radial length of each of the spokes 63 between body portion 21M and the flange 55 is about 0.200 of an inch. It is to be understood that the transducer and mount of FIGS. 4 and 5 could have other dimensions than described above.

We claim:

1. An ultrasonic transducer for welding purposes comprising:

a metal body having a welding end, an opposite end for supporting a source for causing said body and said welding end to vibrate at ultrasonic frequency for welding purposes and intermediate mounting means for supporting said body for welding purposes, said mounting means comprising mounting structure spaced from and surrounding said body and at least two spaced apart spokes connected between said body and said mounting structure for reducing the loss of energy to said mounting structure and increasing the welding efficiency of said transducer.

2. The transducer of claim 1, wherein:

as seen from said welding end, the space between said spokes 360° around said body is much greater than the dimensions of said spokes in the 360° view.

3. The transducer of claim 1, wherein:

said body has a central axis extending between said welding end and said opposite end, said spokes extend in a plane transverse to said axis of said body, each of said spokes has a maximum width in said plane, the space between said spokes in said plane is much greater than the maximum widths of said spokes in said plane.

4. The transducer of claim 1, wherein:

said body has a given length with a central axis extending between said welding end and said opposite end, said spokes extend in a plane transverse to said axis of said body, said mounting structure comprises a cylinder extending around said body.

5. The transducer of claim 4, wherein:

each of said spokes has a maximum width in said plane, the space between said spokes in said plane is much greater than the maximum width of said spokes in said plane, said cylinder has a given length along the length of said body much less than the length of said body, each of said spokes has a maximum dimension along the length of said body which is much less than the length of said cylinder.

6. The transducer of claim 5, wherein:

three spaced apart spokes extend between said body and said cylinder.

7. The transducer of claim 1, wherein:

said body has a given length with a central axis extending between said welding end and said opposite end, said spokes extend in a given plane transverse to said axis of said body, said mounting structure comprise a thin flange extending in said plane around said body.

8. The transducer of claim 7, wherein:

each of said spokes has a maximum width in said plane, the space between said spokes in said plane is much greater than the maximum widths of said spokes in said plane, said flange has a given thickness along the length of said body much less than the length of said body, each of said spokes has a maximum thickness along the length of said body, which is much less than the length of said body.

9. The transducer of claim 7, wherein:

two spaced apart spokes extend between said body and said flange.

* * * * *